(12) United States Patent
Hung et al.

(10) Patent No.: US 7,098,813 B1
(45) Date of Patent: Aug. 29, 2006

(54) PHONE HOLSTER WITH ATTACHED KEYBOARD

(75) Inventors: Yat-Sang Hung, San Diego, CA (US); Michael E. Daley, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 464 days.

(21) Appl. No.: 10/426,075

(22) Filed: Apr. 29, 2003

(51) Int. Cl.
- H03K 17/94 (2006.01)
- H03M 11/00 (2006.01)
- G06F 1/16 (2006.01)
- H04M 1/00 (2006.01)
- G09G 5/00 (2006.01)

(52) U.S. Cl. .................. 341/22; 455/557; 361/681; 224/483; 345/169

(58) Field of Classification Search .......... 341/22, 341/23; 224/236, 483; D3/215–219; D4/251, D4/253; 361/681; 455/557
See application file for complete search history.

(56) References Cited

U.S. PATENT DOCUMENTS

| | | | |
|---|---|---|---|
| D370,776 S | 6/1996 | Frey | |
| D377,117 S | 1/1997 | Klassen | |
| 6,081,695 A | 6/2000 | Wallace et al. | |
| D447,864 S | 9/2001 | Casparian | |
| D467,417 S | 12/2002 | Jackson | |
| D467,727 S | 12/2002 | Kobayashi | |
| D474,594 S | 5/2003 | Casparian | |
| 2002/0063690 A1* | 5/2002 | Chung et al. | 345/168 |
| 2002/0100782 A1* | 8/2002 | Marvin | 224/483 |
| 2003/0003878 A1* | 1/2003 | Bestle | 455/90 |
| 2003/0064751 A1* | 4/2003 | Charlier et al. | 455/557 |
| 2003/0156381 A1* | 8/2003 | Lieu et al. | 361/681 |

OTHER PUBLICATIONS

Pocketop Inc. PDA Accessories-Wireless PDA Keyboard.
Pocket PC Magic-Foldable Keyboard.

* cited by examiner

*Primary Examiner*—Jeffery Hofsass
*Assistant Examiner*—Sisay Yacob

(57) ABSTRACT

A phone holster including a phone carrier attached to a foldable keyboard having a side movable about a pivot to allow the keyboard to extend from a closed position to an open position.

15 Claims, 3 Drawing Sheets

PHONE HOLSTER WITH ATTACHED KEYBOARD

BACKGROUND OF INVENTION

1. Field of Invention

The present invention is directed to a phone holster that is adapted to holster a wireless phone, and more particularly to a phone holster that includes a foldable keyboard as part of the holster.

2. Background of the Invention

The use of wireless phones has increased over the last several years. Moreover, wireless phones are now used for a number of additional purposes beyond simply having a telephone conversation. For example, in some instances wireless phones are now used to send text messages, to send e-mails, and to browse the web. As a result, users are often required to enter a substantial amount of text into their wireless phones. In addition, a number of games have been developed for use in a wireless phone. The traditional phone keypad is tedious and cumbersome to use for the entry of text or for use in playing the various games now available on wireless phones. Consequently, portable keyboards have been developed that may be attached to a wireless phone to allow a user to more easily enter text and to play games. Unfortunately, the portable keyboard constitutes a separate accessory from the phone requiring the user to carry both the wireless phone and the portable keyboard. It takes up a lot of space and is cumbersome to carry both the wireless phone and a portable keyboard. Oftentimes it is impractical to carry both a phone and a keyboard, and even when practical, the keyboard frequently gets left behind. Accordingly, there is a need to provide a way for a phone user to easily carry the phone as well as a keyboard.

SUMMARY OF THE INVENTION

The present invention is specifically directed to a phone holster that is adapted to holster a wireless phone, where the holster further includes a foldable (or clamshell) keyboard as part of the holster. The holster may be clipped to the body of a user and holster a wireless phone and carry a foldable keyboard at the same time. This allows the user to conveniently carry both a wireless phone and a foldable keyboard in one place. Prior to this invention, a user was required to carry the portable keyboard separate and apart from the wireless phone. Thus, the holster of the present invention provides a convenient way for a user to easily carry both the wireless phone and a keyboard.

The holster may be adapted for use with various different wireless phones and may be also be adapted for use with different types of keyboards, including a QWERTY keyboard, gaming keyboards, or any other keyboard the user may desire. The keyboard may be detachable from the holster or integral therewith, and the terms "mounted" and "attached" as used herein shall refer to both. In one embodiment, upon insertion into the phone holster, the cell phone would be connected to the keyboard, such that the display of the phone is visible to the user. Alternately, the phone may be removed from the phone holster and attached to the keyboard for use.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
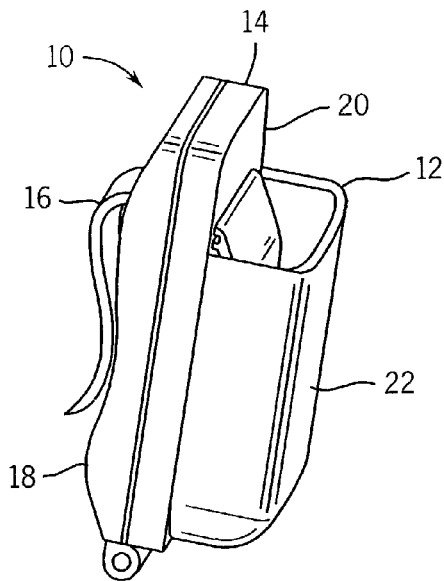
FIG. 1 is a perspective view of a phone holster.

While the invention is susceptible to various modifications and alternative forms, specific embodiments thereof are shown by way of example in the drawings and will herein be described in detail. It should be specifically understood with respect to the drawings, that the drawings are of preferred embodiments, and there are many other embodiments and forms in which the present invention may appear. It should also be understood that the drawings and detailed description thereof are not intended to limit the invention to the particular form disclosed, but on the contrary, the invention is to cover all modifications, equivalents and alternatives falling within the spirit and scope of the present invention or within the scope of the appended claims.

DETAILED DESCRIPTION OF PREFERRED EMBODIMENTS

Figure 2:
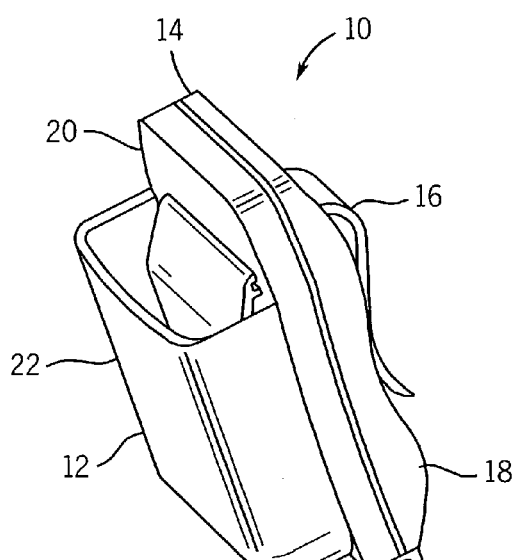
FIG. 2 is another perspective view of the phone holster of FIG. 1.

With reference to FIGS. 1 and 2, an illustrative phone holster 10 is shown. Phone holster 10 includes phone carrier 12 adapted for carrying a phone and a foldable keyboard 14 shown in a folded position. Phone carrier 12 is attached to a first side 20 of the foldable keyboard 14. An attachment element 16 is shown attached to a second side 18 of keyboard 14. While the attachment element 16 is shown attached to second side 18 of the foldable keyboard, it could also be attached to an exterior side 22 of the phone carrier 12. The attachment element is preferably a belt clip that may be attached to the belt of a user to allow the user to carry the phone holster 10 and keyboard 14 on the user's person. The keyboard 14 may be removably attached to the phone carrier 12 in the event that the user does not want to carry the keyboard and wishes to only carry the phone carrier. For example, the phone carrier could contain a slot into which the foldable keyboard fits within, or any other suitable means of removably attaching the phone carrier to the foldable keyboard could be used. Preferably the phone holster is comprised of a hard plastic material such as a durable thermal plastic such as ABS, polycarbonate, or a polymer blend of ABS and polycarbonate as well as some utilization of elastomeric polymers, and the attachment element is made of a rigid plastic with a spring and spring steel covered with a durable, leather-like "skin."

Figure 3:
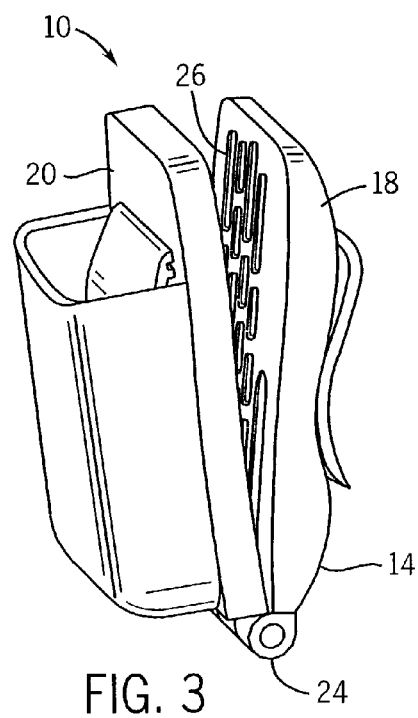
FIG. 3 is a perspective view of a phone holster with a foldable keyboard.

FIG. 3 shows phone holster 10 with foldable keyboard 14. Foldable keyboard 14 is shown having a first side 20 and a second side 18 in a slightly open position. In a folded position, the keys 26 of the keyboard are such that they face one another. Thus, in the closed position, the keys are protected. The foldable keyboard is opened by moving the top of the second side 18 away from the top of the first side 20 where the bottoms of the first and second sides rotate about a pivot 24. It will be appreciated that the foldable keyboard 14 is shown having two sides and a single pivot; however, the foldable keyboard may include additional sides and pivots, and be folded into an accordion-like closed position.

Figure 4:
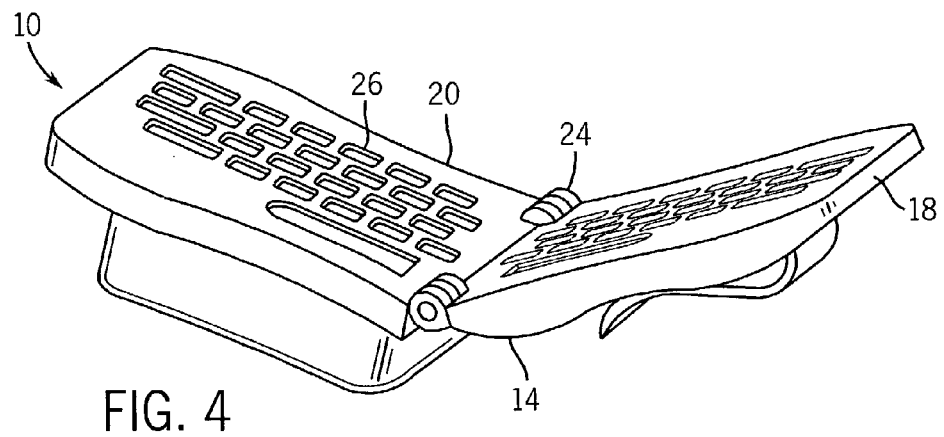
FIG. 4 is another perspective view of a phone holster with a foldable keyboard in a nearly fully open position.
Figure 5:
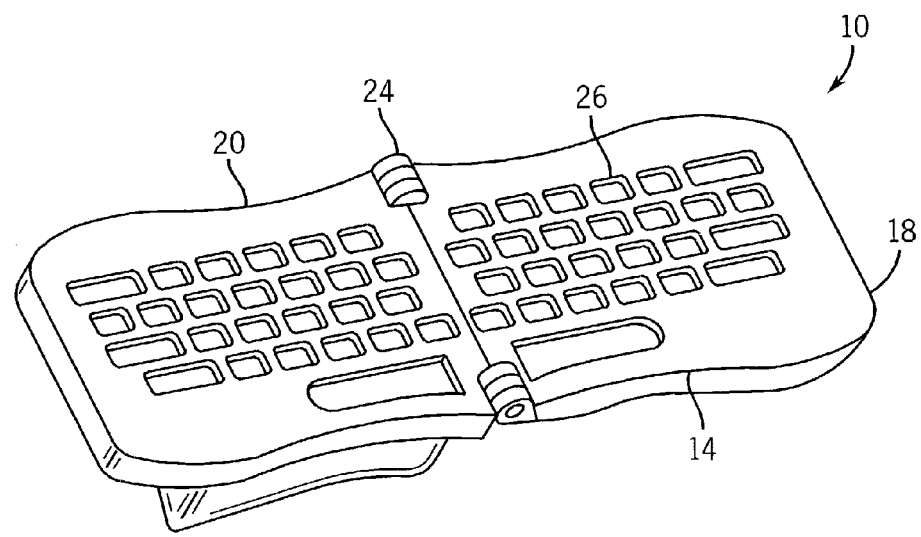
FIG. 5 is a perspective view of a phone holster with the foldable keyboard in a fully open position.
Figure 6:
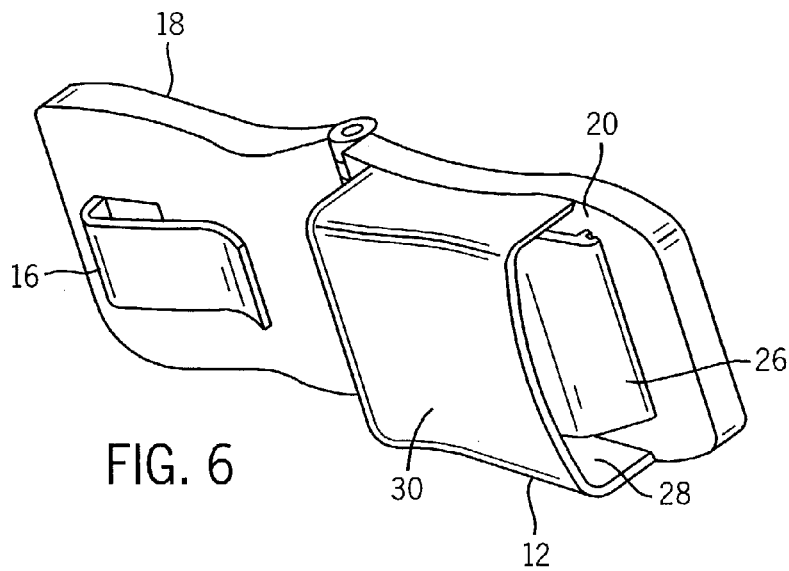
FIG. 6 is a perspective view of the phone holster of FIG. 5 shown from the opposite side.

FIG. 4 shows the phone holster 10 with the first side 20 and the second side 18 of the foldable keyboard 14 in a nearly fully open position. In this manner, the keyboard may be folded open about pivot 24 to provide the user with a keyboard for text entry or game playing. FIG. 5 shows the phone holster 10 with the keyboard 14 in a fully open position. The keyboard may include means for locking the keyboard 14 into a fully open position during use. In this layout the user may easily enter text using the keys 26 of the keyboard 14. FIG. 6 shows a perspective view of the phone holster 10 shown in FIG. 5 from the back side. Attachment element 16 is shown on the back of second side 18 of the keyboard 14. The phone carrier 12 is shown on the back of first side 20 of keyboard 14. The phone carrier 12 includes a cavity 28 into which a wireless phone (not shown) may be inserted. A spring-biased lever 26 is positioned within the cavity 28 to secure the phone within the phone carrier 12. When the phone is inserted the lever is pushed inwardly toward the back of the first side 20 of the keyboard. In this manner, the lever provides a force to push the phone against an outer wall 30 of the phone carrier 12. It is contemplated that the phone holster 10 of the present invention may be used with any type of wireless phone, including foldable, or flip phones.

Figure 7:
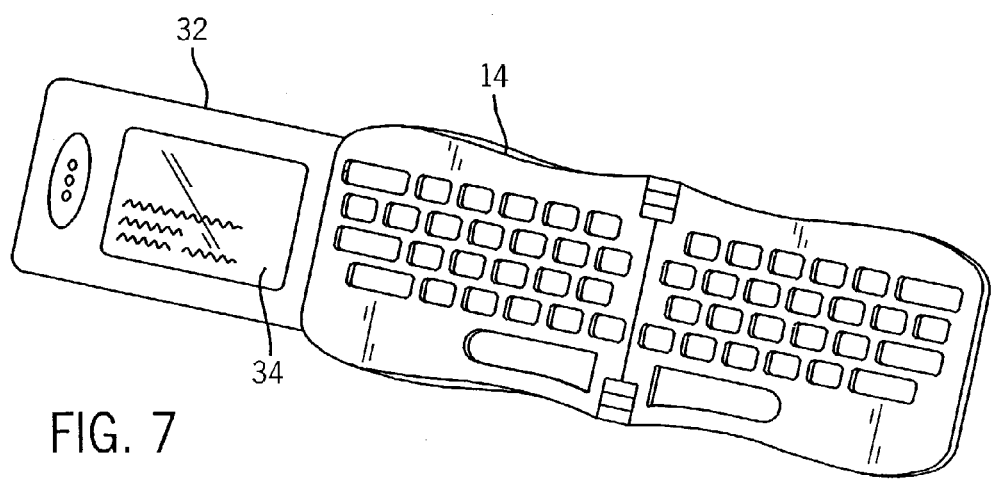
FIG. 7 is a top view of a phone holster with a foldable keyboard in a fully open position with a wireless phone inserted into the holster.

FIG. 7 shows a phone 32 that has been inserted into the phone carrier. A phone display 34 extends from first side 20 of the keyboard 14. Preferably, the phone 32 is adapted to operate in both portrait and landscape mode. In other words, the display may be rotated 90 degrees from the normal viewing mode to allow the user to view the display while entering text on the keyboard 14. Preferably, when the phone 32 is inserted into the phone carrier 12, there is a mechanical/electrical connection between the phone and the keyboard. An optical connection between the phone and keyboard could also be used. Thus, once the phone is inserted into the phone carrier, a connection is made and the keyboard may be used to enter text into the phone. Preferably, the connection can be made using the same connection used to recharge the phone batteries, such as that used in a phone cradle or that used to accept a recharging jack. Thus, a multi-pin connector commonly positioned on the bottom edge or surface of a phone may be used to provide the connection with the keyboard.

The phone holster of the present invention allows for a user to easily and conveniently carry both a wireless phone and a keyboard on the person of a user. The present arrangement helps to eliminate the problems associated with using a keyboard as a separate accessory to the phone. The user may easily carry both the holster and the keyboard at the same time.

What is claimed is:

1. A phone holster comprising:
   a phone carrier adapted for carrying a phone;
   a first keyboard half mounted on a first side of the phone carrier;
   a second keyboard half pivotally attached to the first keyboard half and movable from an open position to a closed position such that keys of both the first half and second half of the keyboard face each other when in the closed position;
   an attachment element positioned on a back side of the second keyboard half suitable to attach the phone carrier to a user.

2. The phone holster of claim 1, further including a movable lever within a cavity of the phone carrier for securing a phone within the phone carrier.

3. The phone holster of claim 2, wherein the phone carrier is adapted to allow the phone to be secured within the carrier and also allow a display of the phone to extend beyond the first keyboard half to allow a user to manipulate the keyboard when in the open position and view images on the phone display.

4. The phone holster of claim 1, further including an electrical connector positioned within a cavity of the phone carrier adapted for electrically connecting a phone to the keyboard.

5. The phone holster of claim 4, wherein the phone carrier is adapted to allow the phone to be secured within the carrier and also allow a display of the phone to extend beyond the first keyboard half to allow a user to manipulate the keyboard when in the open position and view images on the phone display.

6. The phone holster of claim 2, further including an electrical connector positioned within a cavity of the phone carrier adapted for electrically connecting a phone to the keyboard.

7. The phone holster of claim 3, further including an electrical connector positioned within a cavity of the phone carrier adapted for electrically connecting a phone to the keyboard.

8. A foldable keyboard comprising:
   a first keyboard half;
   a second keyboard half pivotally attached to the first keyboard half and movable from a first closed position to a second open position such that keys of both the first half and second half of the keyboard face each other when in the closed position;
   a phone carrier attached to a back side of the first keyboard half; and
   an attachment element positioned on a back side of the second keyboard half suitable to attach the phone carrier to a user.

9. The foldable keyboard of claim 8 wherein the phone carrier includes means for connecting a holstered phone to the keyboard.

10. The foldable keyboard of claim 8, wherein there is a mechanical/electrical connection between a holstered phone and the keyboard.

11. The foldable keyboard of claim 8, wherein the phone carrier is adapted to holster a phone having a display that is visible when the keyboard is in its second open position.

12. The foldable keyboard of claim 8, wherein the phone carrier is rotatably mounted to the back side of the first keyboard half.

13. The phone holster of claim 8, further including a movable lever within a cavity of the phone carrier for securing a phone within the phone carrier.

14. The phone holster of claim 8, further including an electrical connector positioned within a cavity of the phone carrier adapted for electrically connecting a phone to the keyboard.

15. The phone holster of claim 13, further including an electrical connector positioned within a cavity of the phone carrier adapted for electrically connecting a phone to the keyboard.

* * * * *